Sept. 25, 1956        J. G. PERNOLLET ET AL        2,764,029
                        CHANGE SPEED DEVICES
Filed July 8, 1953                               4 Sheets-Sheet 1

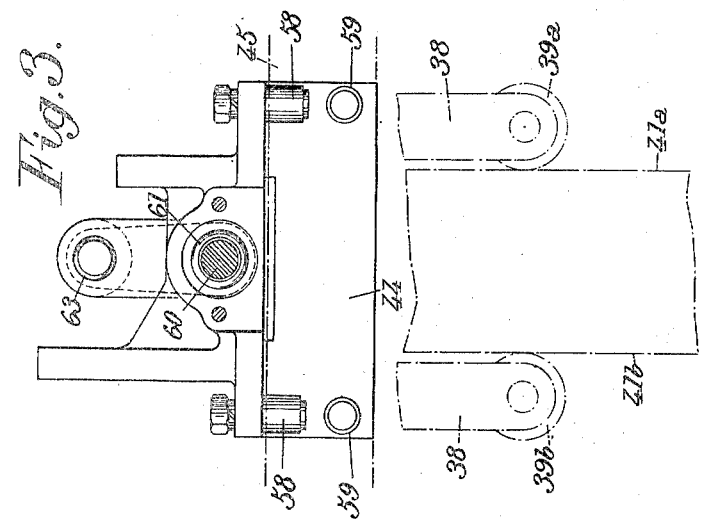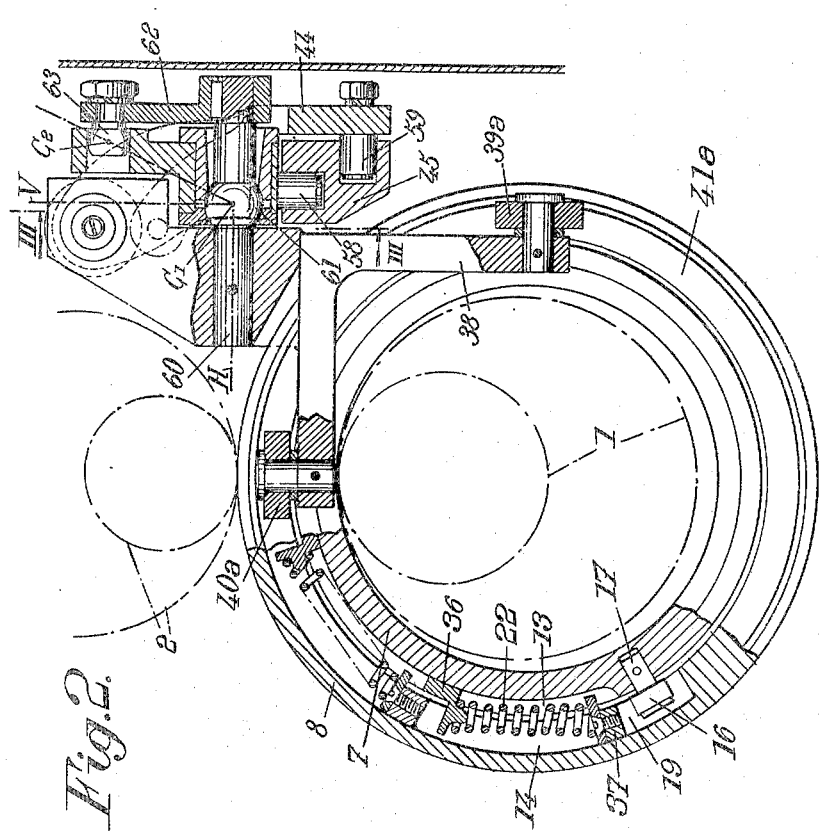

Sept. 25, 1956    J. G. PERNOLLET ET AL    2,764,029
CHANGE SPEED DEVICES
Filed July 8, 1953    4 Sheets-Sheet 4
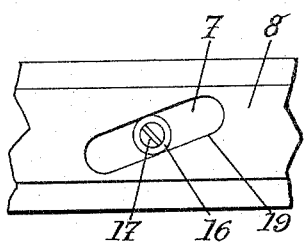
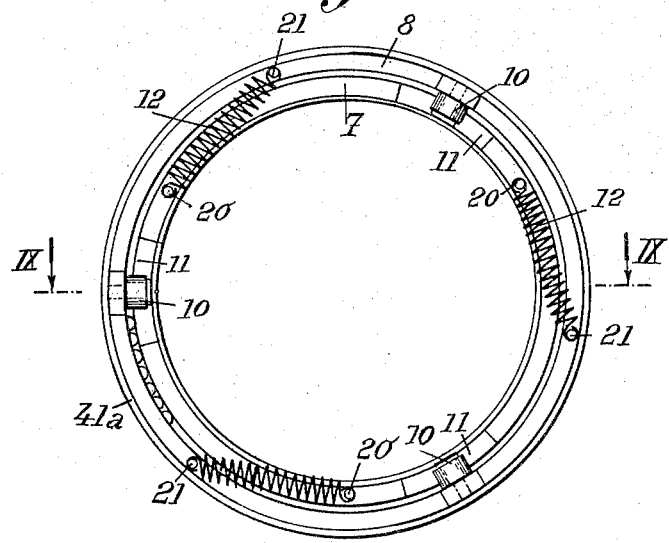
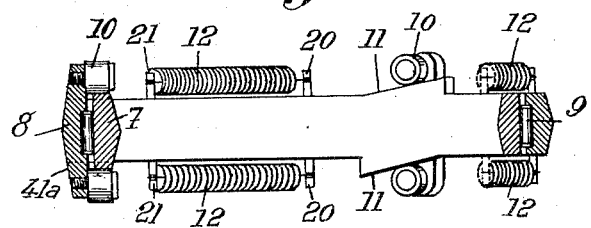

United States Patent Office 2,764,029
Patented Sept. 25, 1956

2,764,029

CHANGE SPEED DEVICES

Jean Guillaume Pernollet, Paris, and Yvon Albert Boyer, Saint-Maurice, France

Application July 8, 1953, Serial No. 366,784

Claims priority, application France July 19, 1952

11 Claims. (Cl. 74—193)

The present invention relates to change speed devices essentially constituted, on the one hand by two rotatable cones (one of these cones may consist of a cylinder) having their axes in the same plane and the two respective generatrices of which which are closest to each other are substantially parallel and, on the other hand, a driving ring structure caught between said two generatrices at a place variable along them so as to transmit torque from one cone to the other with a ratio transmission which depends upon the point where said ring structure is in contact with said two generatrices.

In known change speed devices made up to the present time, the displacement of the ring structure along the generatrices was controlled through an external mechanical member, in the form of a fork, which was itself subjected to the action of mechanical, hydraulic, electric or other control means.

The chief object of our invention is to provide a change speed device of this kind such that the ring structure is constantly and automatically urged toward the position in which it balances the driving and resistant torques.

For this purpose, the ring structure is constituted by two ring elements adapted to run respectively on said two movable cones and movable with respect to each other both angularly and axially in combination with the following means:

Means for causing a relative angular displacement of the two ring elements to produce a relative axial displacement thereof;

Spring means for resiliently opposing such a displacement;

Elastic means for urging the ring structure toward a position for which its middle plane is substantially at right angles to the two parallel generatrices;

And finally means responsive to a rotation of the ring structure about an axis perpendicular to the plane of said two generatrices for rotating it about an axis located in this plane and at right angles to said generatrices, this rotation being such that when there is an unbalance between the driving torque and the resistant torque, the ring structure, when rolling on the two cones, moves along their respective parallel generatrices in the direction which restores the balance between said two torques.

Preferred embodiments of our invention will be hereinafter described with reference to the accompanying drawings, given merely by way of example, and in which:

Fig. 2 is a view partly in elevation and partly in cross section on the line II—II of Fig. 1;

Fig. 3 is a view on the line III—III of Fig. 2 showing the movable part of the ring structure driving mechanism;

Fig. 7 shows a detail of the structure illustrated by Fig. 2;

Figs. 8 and 9 are respectively an elevational view and a section on the line IX—IX of Fig. 8 of a ring structure made according to a modification of that of Figs. 2 and 7.

Figure 1:
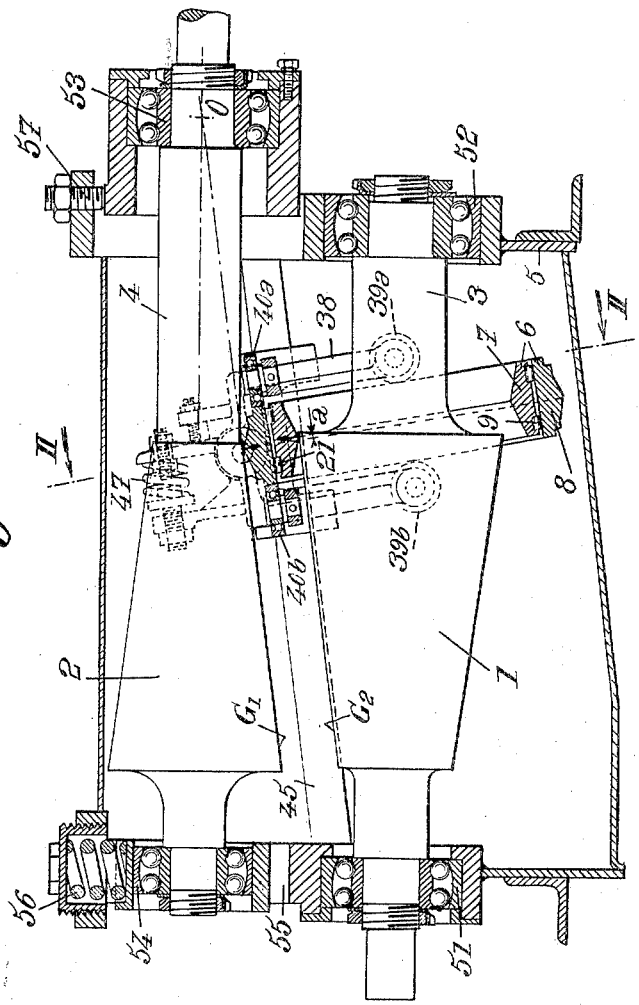
Fig. 1 shows, in longitudinal section by a plane passing through the axes of the two cones, a change speed device made according to our invention.

The change speed device shown by the drawings includes the following elements:

Two friction cones 1 and 2 which constitute respectively the driven and the driving members of the device (Fig. 1). The shafts 3 and 4 of these cones are journalled at their ends in ball bearings or the like 51, 52, 53, 54 carried by a frame 5 so that their axes are located in the same plane and their generatrices G1 and G2 nearest to each other are substantially parallel;

A driving ring structure 6 caught between the two cones at a point variable along the generatrices G1 and G2 so as to transmit torque from cone 2 toward cone 1 with a ratio of transmission which depends upon the position of said ring structure along said generatrices.

In order to have the ring structure caught between the two cones while providing for the pressure that is necessary in order to obtain the driving tangential effort, the driven cone 1 is journalled in fixed bearings 51 and 52 (Fig. 2) and the driving cone at the end thereof which is of smaller diameter is mounted in a fixed swivel bearing 53 and at the other end in a bearing 54 which is slidable in a slideway 55 provided in frame 5 and located in the plane of the axes of the two cones. We may provide, for swivel bearing 53, an adjustment device such as diagrammatically shown in the form of an abutment-screw 57, which makes it possible to have contact generatrices G1 and G2 at least substantially parallel for a ring structure of a given thickness. Elastic means, such as a spring 56, are provided for urging bearing 54 toward the driven cone 1 and to provide for the necessary driving pressure between the ring and the cones.

The result of such an arrangement is to increase the driving pressure when the ring structure is moved in the direction which increases the ratio of transmission (that is to say toward the right, in Fig. 2, where 2 is the driving cone and 1 the driven cone) and, consequently, to reduce to a minimum the fatigues of the pieces in movement. If the center O of bearing 53 is located at the apex of cone 2 or close to this point, the driving pressure varies automatically to be substantially proportional to the value of the torque. The pivoting of cone 2 has also for its effect constantly to take up play as it results from the wear of cones 1 and 2 and of the ring structure.

Concerning now driving ring structure 6, it is constituted, according to our invention, by two concentric ring elements, to wit an inner one 7 and an outer one 8, which run respectively on cones 1 and 2 and which can move with respect to each other both angularly, that is to say by relative rotation about their common axis and axially, that is to say by relative translation in the direction of said axis. In order to facilitate this rotational displacement, we advantageously interpose, between ring elements 7 and 8, rollers, balls, and the like which also permit a slight axial displacement.

These ring elements are first provided with means such that a relative angular rotation of the two elements with respect to each other causes them to have a relative translatory axial displacement with respect to each other.

According to the construction illustrated by Figs. 2 and 7, such means are constituted by three rollers 16 carried by axes 17 rigid with the inner ring element 7 and cooperating with oblique slots 19 provided in the outer ring element 8.

According to another embodiment illustrated by Figs. 8 and 9, these means are constituted by two sets of rollers 10 carried by the outer ring element 8 and cooperating with two sets of inclined surfaces 11 provided on the edges of the inner ring element 7.

The ring elements are further provided with elastic means for resiliently opposing a relative angular displacement thereof, and said means are constituted as follows:

In the construction of Fig. 2, they consist of springs 22 fixed at their respective ends to two brackets 36 and 37 respectively secured to the inner ring element 7 and the outer ring element 8, these springs 22 being housed in recesses 13 and 14 provided respectively in ring elements 7 and 8.

According to the construction of Figs. 8 and 9, the means consist of springs 12 fixed to the outside of ring elements 7–8 respectively by pins 20 and 21.

The ring structure is also provided with elastic means for urging it toward a position in which its middle plane is substantially perpendicular to the two contact generatrices G1 and G2.

Figure 4:
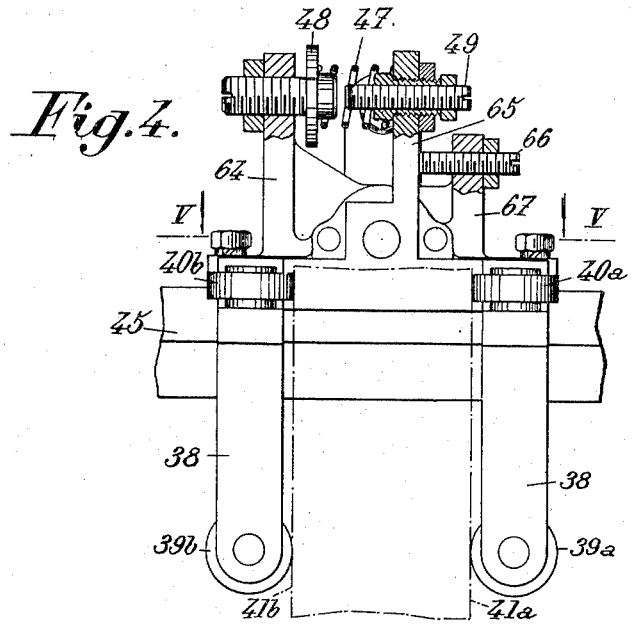
Fig. 4 is an elevational view of the mechanism of Fig. 2 with parts cut away.

For this purpose, ring structure 6 is disposed in a guiding mechanism constituted by a fork 38 hinged on a carriage 44 (see also Figs. 2, 3 and 4) which may slide freely on a rail 45 carried by frame 5 and parallel to contact generatrices G1 and G2.

Carriage 44 may be arranged to slide with an easy fit along rail 45, but it seems preferable to interpose two series of rollers such as 58 and 59 mounted on carriage 44 and engaged in longitudinal grooves provided in rail 45. The middle planes of the two series of rollers 58 and 59, and consequently those of the grooves which accommodate them, are preferably disposed at 90° to each other and the end rollers are at a sufficient distance from each other to achieve a guiding of sliding carriage 44 practically without play.

The guiding fork 38 carries two series of rollers 39a, 39b, 40a, 40b such that the side walls 41a and 41b (Fig. 3) of the external ring element 8 are resting permanently against the above mentioned rollers so as to keep unchanged the position of the middle plane of said ring structure with respect to fork 38. Said rollers may be constituted by the outer cages of ball or roller bearings the inner cages of which are rigid with fork 38. Fork 38 is hinged on carriage 44 and we interpose between the fork and the carriage the elastic means which urge the ring structure toward the position for which its middle plane is substantially at right angles to the contact generatrices G1 and G2.

Such means are constituted by a spring 47 (Fig. 4) interposed between an arm 64, rigid with carriage 44, and an arm 65, rigid with fork 38. The action of spring 47 is adjustable by means of a screw device 48.

The inclination of ring structure 6 is limited in both directions by abutment-screws such as 49, carried by the arm 65 of the fork and cooperating with device 48 and 66 carried by an arm 67 rigid with the carriage and cooperating with the arm 65 of the fork.

Finally, the ring structure is provided with means such that a rotation of said ring structure about an axis at right angles to the plane of generatrices G1 and G2, causes a rotation thereof about an axis located in this plane and perpendicular to said generatrices, the amplitude of this rotation varying in the same direction as that of the first mentioned rotation.

This result is obtained by pivoting fork 38 on carriage 44 about an axis $C_1C_2$ (Fig. 2) oblique with respect to the perpendicular to the plane passing through the contact generatrices, the axis $C_1C_2$ being itself approximately in a plane perpendicular to the contact generatrices.

Figure 5:
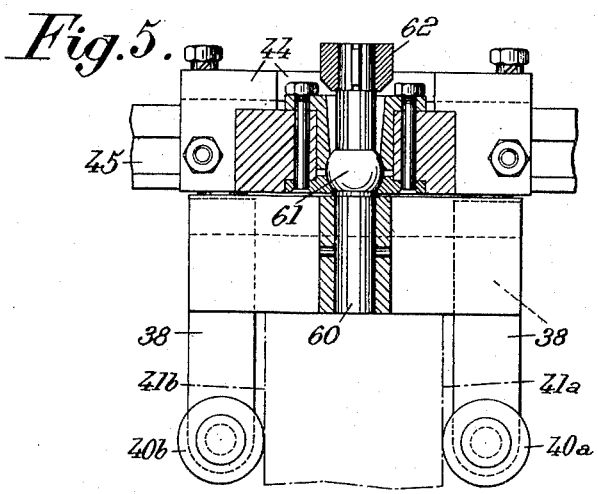
Fig. 5 is a section on the line V—V of Fig. 4.

According to an advantageous construction, fork 38 is carried by a shaft 60 (Figs. 2 and 5) fixed thereon and journalled on carriage 44 about point $C_1$ through a ball and socket joint 61. On this shaft 60 is fixed a lever 62 itself journalled on the carriage 44 about the point $C_2$ through a ball and socket joint 63.

The automatic change speed device which has been described works in the following manner.

The cross section of ring structure 6 is so shaped that the pressure applied thereon tends to move it away from the position in which it is substantially perpendicular to contact generatrices G1 and G2. This is due to the fact that as soon as the compression forces diagrammatically represented by the arrows of Fig. 1 are at a distance $a$ from each other, there is formed a torque porportional to said forces and to said distance $a$.

If it is supposed first that ring structure 6 is in balanced position and that the resistant torque increases, in order to restore a balancing of the torque the diameter of the line of contact of the ring structure with the driven cone must be reduced while the corresponding diameter of the contact line of the ring structure with the driving cone increases.

Increase of the resistant torque has for its effect, by varying the tension of springs 12 or 22, to cause ring elements 7 and 8 to rotate with respect to each other and, therefore, to move axially with respect to each other, whereby the outer ring element 8 moves toward the left hand side (Fig. 1) with respect to ring element 7. As the ring structure is elastically maintained by fork 38, this relative axial displacement produces a longitudinal displacement of the ring elements 7 and/or 8 respectively on cones 1 and/or 2, the point of contact of ring element 8 on cone 2 being moved toward the left with respect to the point of contact of ring element 7 on cone 1, by a distance $a$.

The pressure forces exerted by the cones produce a torque which causes the ring structure to rotate, against spring 47, in a direction which is determined by the direction of relative variation of the driving and resistant torque and about an axis which is substantially perpendicular to the plane of the contact generatrices.

Now, the guiding mechanism is arranged in such manner that any rotation about an axis $C_1H$ (Fig. 2) causes a rotation to take place about axis $C_1V$ perpendicular to $C_1H$ in plane $C_1C_2H$. The angles of the rotation about $C_1H$ and the rotation about $C_1V$ relatively to each other are fixed by trigonometric relations such that when the first one increases, the second one also increases.

Figure 6:
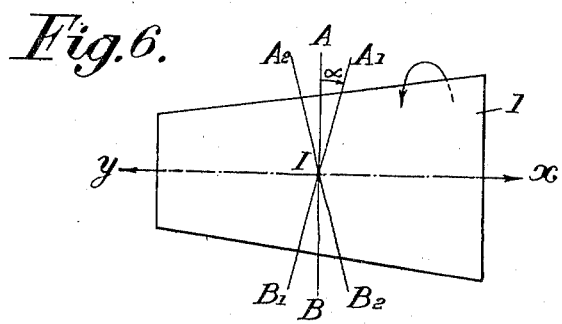
Fig. 6 is a diagrammatical view illustrating the operation of the change speed device shown by the drawing.

A rotation about axis $C_1V$ may be considered as a rotation about axis I (Fig. 6—on this figure, cone 1 is seen from the top of Fig. 2, cone 2 being supposed to have been removed, and always turns in the direction shown by the arrow) which is the common perpendicular to contact generatrices G1 and G2 with respect to the position of equilibrium between the driving and the resistance torques for which the middle plane AB of the ring structure is perpendicular to the generatrices of contact.

The rotation due to the increase of the resistant torque has for its effect to subject the ring structure to another rotation about axis $C_1B$ which brings the plane AB of the ring into position $A_2B_2$, which causes the ring structure to move toward the left hand side of the drawing in the direction $Iy$. Reciprocally, if the resistant torque decreases, the ring structure undergoes a primary rotation which determines a secondary rotation such that its middle plane AB is brought into the position $A_1B_1$, which moves the ring toward the right of the drawing, in the direction $Ix$. Consequently, the ring is always urged toward the position for which balance is again obtained between the driving and resistant torques.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. A change speed device which comprises, in combination, a frame, a driven member and a driving member journalled in said frame, the outer surfaces of these members being in the form of bodies formed by revolution of straight generatrices about respective axes, said axes being located in the same plane and the respective generatrices of said bodies located in this plane and nearest to each other being parallel, the ratio of the respective diameters of the cross sections of said bodies by a common plane at right angles to said axes varying continuously when said plane is moving in a direction parallel to said axes, a driving ring structure passing around one of said members and caught between said two generatrices to transmit torque from said driving member to said driven member with a transmission ratio variable in accordance with the position of said ring structure along said two generatrices, said ring structure including two coaxial ring elements movable with respect to each other both by relative rotation about their common axis and by relative translation parallel to said axis, means interposed between said ring elements for producing such a translatory relative displacement in response to such a rotational relative displacement of said ring elements, spring means between said ring elements for resiliently opposing said relative displacements thereof, elastic means for urging said ring structure toward a position at right angles to said two generatrices, and means responsive to rotation of said ring structure about an axis at right angles to the plane of said two generatrices for rotating said ring structure about an axis located in said plane and at right angles to said two generatrices to restore the balance between the driving torque supplied by said driving member and the resistant torque supplied by said driven member.

2. A change speed device which comprises, in combination, a frame, fixed bearings carried by said frame, a driven member journalled in said fixed bearings, a driving member of a larger diameter at one end than at the other, a fixed swivel bearing carried by said frame for supporting said driving member at the end thereof where its diameter is smaller, a bearing movable in said frame for supporting the other end of said driving member, and elastic means for urging said movable bearing toward said driven member, the outer surfaces of these members being in the form of bodies formed by revolution of straight generatrices about respective axes, said axes being located in the same plane and the respective generatrices of said bodies located in this plane and nearest to each other being parallel, the ratio of the respective diameters of the cross sections of said bodies by a common plane at right angles to said axes varying continuously when said plane is moving in a direction parallel to said axes, a driving ring structure passing around one of said members and caught between said two generatrices to transmit torque from said driving member to said driven member with a transmission ratio variable in accordance with the position of said ring structure along said two generatrices, said ring structure including two coaxial ring elements movable with respect to each other both by relative rotation about their common axis and by relative translation parallel to said axis, means interposed between said ring elements for producing such a translatory relative displacement in response to such a rotational relative displacement of said ring elements, spring means between said ring elements for resiliently opposing said relative displacements thereof, elastic means for urging said ring structure toward a position at right angles to said two generatrices, and means responsive to rotation of said ring structure about an axis at right angles to the plane of said two generatrices for rotating said ring structure about an axis located in said plane and at right angles to said two generatrices to restore the balance between the driving troque supplied by said driving member and the resistant torque supplied by said driven member.

3. A change speed according to claim 2 in which said driving member is of conical shape and said fixed swivel bearing is located at the apex of said conical surface.

4. A change speed device which comprises, in combination, a frame, a driven member and a driving member journalled in said frame, the outer surfaces of these members being in the form of bodies formed by revolution of straight generatrices about respective axes, said axes being located in the same plane and the respective generatrices of said bodies located in this plane and nearest to each other being parallel, the ratio of the respective diameters of the cross sections of said bodies by a common plane at right angles to said axes varying continuously when said plane is moving in a direction parallel to said axes, a driving ring structure passing around one of said members and caught between said two generatrices to transmit torque from said driving member to said driven member with a transmission ratio variable in accordance with the position of said ring structure along said two generatrices, said ring structure including two coaxial ring elements movable with respect to each other both by relative rotation about their common axis and by relative translation parallel to said axis, one of said ring elements being provided with slots oblique to the axis thereof, rollers carried by the other ring element engaging in said slots, whereby a rotational relative displacement of said ring elements with respect to each other produces a translatory relative displacement thereof, spring means between said ring elements for resiliently opposing said relative displacements thereof, elastic means for urging said ring structure toward a position at right angles to said two generatrices, and means responsive to rotation of said ring structure about an axis at right angles to the plane of said two generatrices for rotating said ring structure about an axis located in said plane and at right angles to said two generatrices to restore the balance between the driving torque supplied by said driving member and the resistant torque supplied by said driven member.

5. A change speed device which comprises, in combination, a frame, a driven member and a driving member journalled in said frame, the outer surfaces of these members being in the form of bodies formed by revolution of straight generatrices about respective axes, said axes being located in the same plane and the respective generatrices of said bodies located in this plane and nearest to each other being parallel, the ratio of the respective diameters of the cross sections of said bodies by a common plane at right angles to said axes varying continuously when said plane is moving in a direction parallel to said axes, a driving ring structure passing around one of said members and caught between said two generatrices to transmit torque from said driving member to said driven member with a transmission ratio variable in accordance with the position of said ring structure along said two generatrices, said ring structure including two coaxial ring elements movable with respect to each other both by relative rotation about their common axis and by relative translation parallel to said axis, the edges of one of said ring elements being provided with at least two series of inclined surfaces, at least two sets of rollers carried by the other ring element and cooperating with said inclined surfaces for producing a translatory relative displacement of said ring elements with respect to each other in response to rotational relative displacement thereof, spring means between said ring elements for resiliently opposing said relative displacements thereof, elastic means for urging said ring structure toward a position at right angles to said two generatrices, and means responsive to rotation of said ring structure about an axis at right angles to the plane of said two generatrices for rotating said ring structure about an axis located in said plane and at right angles to said two generatrices to restore the balance between the driving torque supplied by said driving member and the resistant torque supplied by said driven member.

6. A change speed device which comprises, in combination, a frame, a driven member and a driving member journalled in said frame, the outer surfaces of these members being in the form of bodies formed by revolution of straight generatrices about respective axes, said axes being located in the same plane and the respective generatrices of said bodies located in this plane and nearest to each other being parallel, the ratio of the respective diameters of the cross sections of said bodies by a common plane at right angles to said axes varying continuously when said plane is moving in a direction parallel to said axes, a driving ring structure passing around one of said members and caught between said two generatrices to transmit torque from said driving member to said driven member with a transmission ratio variable in accordance with the position of said ring structure along said two generatrices, said ring structure including two coaxial ring elements movable with respect to each other both by relative rotation about their common axis and by relative translation parallel to said axis, means interposed between said ring elements for producing such a translatory relative displacement in response to such a rotational relative displacement of said ring elements, spring means between said ring elements for resiliently opposing said relative displacements thereof, a rail parallel to said two generatrices, a carriage slidable along said rail, a fork connected with said ring structure pivoted to said carriage, and a spring interposed between said carriage and said fork for urging said fork toward a position at right angles to said two generatrices, and means responsive to rotation of said ring structure about an axis at right angles to the plane of said two generatrices for rotating said ring structure about an axis located in said plane and at right angles to said two generatrices to restore the balance between the driving torque supplied by said driving member and the resistant torque supplied by said driven member.

7. A change speed device which comprises, in combination, a frame, a driven member and a driving member journalled in said frame, the outer surfaces of these members being in the form of bodies formed by revolution of straight generatrices about respective axes, said axes being located in the same plane and the respective generatrices of said bodies located in this plane and nearest to each other being parallel, the ratio of the respective diameters of the cross sections of said bodies by a common plane at right angles to said axes varying continuously when said plane is moving in a direction parallel to said axes, a driving ring structure passing around one of said members and caught between said two generatrices to transmit torque from said driving member to said driven member with a transmission ratio variable in accordance with the position of said ring structure along said two generatrices, said ring structure including two coaxial ring elements movable with respect to each other both by relative rotation about their common axis and by relative translation parallel to said axis, one of said ring elements being provided with slots oblique to the axis thereof, rollers carried by the other ring element engaging in said slots, whereby a rotational relative displacement of said ring elements with respect to each other produces a translatory relative displacement thereof, spring means between said ring elements for resiliently opposing said relative displacements thereof, a rail parallel to said two generatrices, a carriage slidable along said rail, a fork connected with said ring structure pivoted to said carriage, and a spring interposed between said carriage and said fork for urging said fork toward a position at right angles to said two generatrices, and means responsive to rotation of said ring structure about an axis at right angles to the plane of said two generatrices for rotating said ring structure about an axis located in said plane and at right angles to said two generatrices to restore the balance between the driving torque supplied by said driving member and the resistant torque supplied by said driven member.

8. A change speed device which comprises, in combination, a frame, a driven member and a driving member journalled in said frame, the outer surfaces of these members being in the form of bodies formed by revolution of straight generatrices about respective axes, said axes being located in the same plane and the respective generatrices of said bodies located in this plane and nearest to each other being parallel, the ratio of the respective diameters of the cross sections of said bodies by a common plane at right angles to said axes varying continuously when said plane is moving in a direction parallel to said axes, a driving ring structure passing around one of said members and caught between said two generatrices to transmit torque from said driving member to said driven member with a transmission ratio variable in accordance with the position of said ring structure along said two generatrices, said ring structure including two coaxial ring elements movable with respect to each other both by relative rotation about their common axis and by relative translation parallel to said axis, the edges of one of said ring elements being provided with at least two series of inclined surfaces, at least two sets of rollers carried by the other ring element and cooperating with said inclined surfaces for producing a translatory relative displacement of said ring elements with respect to each other in response to rotational relative displacement thereof, spring means between said ring elements for resiliently opposing said relative displacements thereof, a rail parallel to said two generatrices, a carriage slidable along said rail, a fork connected with said ring structure pivoted to said carriage, and a spring interposed between said carriage and said fork for urging said fork toward a position at right angles to said two generatrices, and means responsive to rotation of said ring structure about an axis at right angles to the plane of said two generatrices for rotating said ring structure about an axis located in said plane and at right angles to said two generatrices to restore the balance between the driving torque supplied by said driving member and the resistant torque supplied by said driven member.

9. A change speed according to claim 6 including rollers journalled on said fork and bearing against the outer edge of one of said ring elements, whereby said fork is connected with said ring structure.

10. A change speed device according to claim 6 further including two series of rollers journalled in said carriage and located in different planes, said guiding rail being provided with longitudinal grooves adapted to cooperate with said rollers.

11. A change speed device which comprises, in combination, a frame, a driven member and a driving member journalled in said frame, the outer surfaces of these members being in the form of bodies formed by revolution of straight generatrices about respective axes, said axes being located in the same plane and the respective generatrices of said bodies located in this plane and nearest to each other being parallel, the ratio of the respective diameters of the cross sections of said bodies by a common plane at right angles to said axes varying continuously when said plane is moving in a direction parallel to said axes, a driving ring structure passing around one of said members and caught between said two generatrices to transmit torque from said driving member to said driven member with a transmission ratio variable in accordance with the position of said ring structure along said two generatrices, said ring structure including two coaxial ring elements movable with respect to each other both by relative rotation about their common axis and by relative translation parallel to said axis, means interposed between said ring elements for producing such a translatory relative displacement in response to such a rotational relative displacement of said ring elements, spring means between said ring elements for resiliently opposing said relative displacements thereof, a rail parallel to said two generatrices, a carriage slidable along said rail, a fork connected with said ring structure pivoted to said carriage, and a spring interposed between said carriage and said fork for urging said fork toward a position at right angles to said two generatrices, a shaft fixed to said fork and perpendicular to the plane of said two generatrices, a swivel joint for connecting said shaft to said carriage, a lever fixed to said shaft, and a swivel joint for connecting said lever to said carriage, the line passing through the respective centers of said two swivel joints being oblique both to said shaft and to the plane passing through the center of the first mentioned swivel joint and parallel to the plane of said two generatrices.

References Cited in the file of this patent

UNITED STATES PATENTS

| | | |
|---|---|---|
| 1,537,009 | Hagman | May 5, 1925 |
| 2,570,493 | Schmidt | Oct. 9, 1951 |
| 2,583,790 | Mikina | Jan. 29, 1952 |

FOREIGN PATENTS

| | | |
|---|---|---|
| 683,063 | Germany | Oct. 30, 1939 |